US012565851B1

(12) United States Patent
Pugh et al.

(10) Patent No.: US 12,565,851 B1
(45) Date of Patent: Mar. 3, 2026

(54) SYSTEMS AND METHODS FOR CONTROLLING COMBUSTION IN AN ENGINE OF A MARINE DRIVE

(71) Applicant: Brunswick Corporation, Mettawa, IL (US)

(72) Inventors: Jason F. Pugh, Ripon, WI (US); David D. Dins, Mount Calvary, WI (US); Christopher R. Jenks, Rosendale, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 18/787,109

(22) Filed: Jul. 29, 2024

Related U.S. Application Data

(60) Provisional application No. 63/516,909, filed on Aug. 1, 2023.

(51) Int. Cl.
*F02B 61/04* (2006.01)
*F02D 41/00* (2006.01)
*F02D 41/14* (2006.01)

(52) U.S. Cl.
CPC ........ *F02B 61/045* (2013.01); *F02D 41/0002* (2013.01); *F02D 41/1475* (2013.01); *F02D 2200/0414* (2013.01); *F02D 2200/0418* (2013.01); *F02D 2200/703* (2013.01)

(58) Field of Classification Search
CPC ........ F02B 61/045; F02D 9/105; F02D 13/00; F02D 41/0002; F02D 41/1475; F02D 2013/005; F02D 2200/0414; F02D 2200/0418; F02D 2200/703; F02M 35/10373; F02M 35/10393; B63H 21/14; B63H 21/21; B63H 2021/216
See application file for complete search history.

(56) References Cited

U.S. PATENT DOCUMENTS

| | | | | |
|---|---|---|---|---|
| 6,062,204 | A * | 5/2000 | Cullen | F02P 5/15 123/406.12 |
| 6,575,148 | B1 * | 6/2003 | Bhargava | F02B 37/22 123/406.19 |
| 9,249,764 | B2 * | 2/2016 | Wiggins | F02D 41/065 |
| 9,618,470 | B2 * | 4/2017 | Uhrich | F02P 5/045 |
| 9,835,521 | B1 | 12/2017 | Snyder | |
| 9,863,347 | B2 * | 1/2018 | Yokono | F02D 41/021 |

(Continued)

*Primary Examiner* — Grant Moubry
(74) *Attorney, Agent, or Firm* — Andrus Intellectual Property Law, LLP

(57) ABSTRACT

Systems and methods are for controlling combustion in a marine drive. The systems can include a computer processor device and a computer memory device comprising instructions. The instructions are executable by the computer processor device to control a timing of spark in an engine, by determine a base spark advance based on a predetermined nominal humidity, a load of the engine, and a revolutions per minute (RPM) value of the engine. Additionally, the instructions are executable to determine a humidity offset value based on a specific humidity of intake air to the engine and the load of the engine. Further, the instructions are executable to determine a controlling spark advance value based on the base spark advance and the humidity offset value. Additionally, the instructions are executable to send the controlling spark advance value to an ignition system of the engine.

20 Claims, 10 Drawing Sheets

(56) References Cited

U.S. PATENT DOCUMENTS

| | | | | |
|---|---|---|---|---|
| 9,938,953 | B2 * | 4/2018 | Hakeem | F02P 5/152 |
| 9,970,373 | B1 | 5/2018 | Arbuckle | |
| 10,018,136 | B1 * | 7/2018 | Anschuetz | F02D 31/007 |
| 10,322,786 | B1 | 6/2019 | Anschuetz | |
| 10,358,997 | B1 | 7/2019 | Anschuetz | |
| 10,371,068 | B2 * | 8/2019 | McQuillen | F02D 37/02 |
| 2013/0238218 | A1 * | 9/2013 | Wiggins | F02D 41/065 701/102 |

* cited by examiner

SYSTEMS AND METHODS FOR CONTROLLING COMBUSTION IN AN ENGINE OF A MARINE DRIVE

CROSS REFERENCE TO RELATED APPLICATION

This application claims benefit of priority to U.S. Provisional Application No. 63/516,909, filed Aug. 1, 2023, which is hereby incorporated by reference in entirety.

FIELD

The present disclosure relates to marine drives, and particularly to systems and methods for controlling combustion in an engine of a marine drive.

BACKGROUND

The following U.S. Patents provide background and are incorporated herein by reference: U.S. Pat. Nos. 9,835,521; 9,970,373; 10,322,786; and 10,358,997.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In non-limiting examples, systems are disclosed herein for controlling combustion in an engine of a marine drive. An exemplary system can include a computer processor device, and a computer memory device comprising instructions that are executable by the computer processor device to control a timing of spark in an engine. The timing of spark is controlled by determining a base spark advance based on a predetermined nominal humidity, a load of the engine, and a revolutions per minute (RPM) value of the engine. Additionally, the timing of spark is controlled by determining a humidity offset value based on a specific humidity of intake air to the engine and the load of the engine. Further, the timing of spark is controlled by determining a controlling spark advance value based on the base spark advance and the humidity offset value. Additionally, the timing of spark is controlled by sending the controlling spark advance value to an ignition system of the engine.

In another exemplary system, determining the base spark advance involves performing a lookup in a base spark map. The base spark map maps the base spark advance to the predetermined nominal humidity, the load, and the RPM value.

In another exemplary system, determining the humidity offset value comprises performing a lookup in a humidity offset map, wherein the humidity offset map maps the humidity offset value to the specific humidity and the load.

In another exemplary system, the timing of the spark in the engine is controlled by determining the spark advance for the spark plug in response to a change in the load of the engine.

In another exemplary system, an intake airflow of the engine is controlled by determining a new intake airflow based on the load of the engine and the specific humidity. Additionally, the intake airflow is controlled by determining a throttle opening of the engine based on the new intake airflow. Further, the intake airflow is controlled by sending the determined throttle opening to the throttle motor.

In another exemplary system, the specific humidity is determined by determining a first ambient temperature using a temperature sensor of a humidity sensor. Additionally, the specific humidity is determined by determining a first ambient barometric pressure using a barometric pressure sensor of the humidity sensor. Further, the specific humidity is determined by determining the specific humidity based on the first ambient temperature and the first ambient barometric pressure.

In another exemplary system, the instructions are executable by the computer processor device to determine that the humidity sensor is faulty based on the first ambient temperature and a second ambient temperature determined using an engine temperature sensor. Further, the instructions are executable by the computer processor device to determine the specific humidity based on the second ambient temperature and the first ambient barometric pressure.

In another exemplary system, the instructions are executable by the computer processor device to determine that the humidity sensor is faulty based on the first ambient barometric pressure and a second ambient barometric pressure determined using an engine barometric pressure sensor. Additionally, the instructions are executable by the computer processor to determine the specific humidity based on the first ambient temperature and the second ambient barometric pressure.

In another exemplary system, the instructions are executable by the computer processor device to determine that the humidity sensor is faulty based on the first ambient temperature, a second ambient temperature determined using an engine temperature sensor, the first ambient barometric pressure, and a second ambient barometric pressure determined using an engine barometric pressure sensor. Further, the instructions are executable by the computer processor device to determine the specific humidity based on the second ambient temperature and the second ambient barometric pressure.

Another exemplary system for controlling combustion in a marine drive includes a computer processor device, and a computer memory device comprising instructions that are executable by the computer processor device to control an intake airflow of the engine. The intake airflow is controlled by determining a new intake airflow based on the load of the engine and the specific humidity. Additionally, the intake airflow is controlled by determining a throttle opening of the engine based on the new intake airflow.

In another exemplary system, the instructions are executable by the computer processor device to determine a base spark advance based on a predetermined nominal humidity, a load of the engine, and a revolutions per minute (RPM) value of the engine. Further, the instructions are executable by the computer processor device to determine a humidity offset value based on a specific humidity of intake air to the engine and the load of the engine. Additionally, the instructions are executable by the computer processor device to determine a controlling spark advance value based on the base spark advance and the humidity offset value. Further, the instructions are executable by the computer processor device to send the controlling spark advance value to an ignition system the engine.

In another exemplary system, determining the base spark advance involves performing a lookup in a base spark map. The base spark map maps the base spark advance to the predetermined nominal humidity, the load, and the RPM value.

In another exemplary system, determining the humidity offset value involves performing a lookup in a humidity offset map. The humidity offset map maps the humidity offset value to the specific humidity and the load.

In another exemplary system, the instructions are executable by the computer processor device to control the timing of the spark in the engine by determining the spark advance for the spark plug in response to a change in the load of the engine.

In another exemplary system, the instructions are executable by the computer processor device to control an intake airflow of the engine by determining a new intake airflow based on the load of the engine and the specific humidity. Additionally, the intake airflow is controlled by determining a throttle opening of the engine based on the new intake airflow. Further, the intake airflow is controlled by sending the determined throttle opening to the throttle motor.

In another exemplary system, the instructions are executable by the computer processor device to determine the specific humidity by determining a first ambient temperature using a temperature sensor of a humidity sensor. Additionally, the specific humidity is determined by determining a first ambient barometric pressure using a barometric pressure sensor of the humidity sensor. Further, the specific humidity is determined by determining the specific humidity based on the first ambient temperature and the first ambient barometric pressure.

In another exemplary system, the instructions are executable by the computer processor device to determine that the humidity sensor is faulty based on the first ambient temperature, a second ambient temperature determined using an engine temperature sensor, the first ambient barometric pressure, and a second ambient barometric pressure determined using an engine barometric pressure sensor. Additionally, the instructions are executable by the computer processor device to determine the specific humidity based on the second ambient temperature and the second ambient barometric pressure.

Another exemplary system for controlling combustion in a marine drive includes an engine, a computer processor device, and a computer memory device comprising instructions that are executable by the computer processor device to control a timing of spark in the engine. The timing of the spark is controlled by determining a base spark advance based on a predetermined nominal humidity, a load of the engine, and a revolutions per minute (RPM) value of the engine. Additionally, the timing of the spark is controlled by determining a humidity offset value based on a specific humidity of intake air to the engine and the load of the engine. Further, the timing of the spark is controlled by determining a controlling spark advance value based on the base spark advance and the humidity offset value. Additionally, the timing of the spark is controlled by sending the controlling spark advance value to an ignition system of the engine.

In another exemplary system, the instructions are executable by the computer processor device to control an intake airflow of the engine by determining a new intake airflow based on the load of the engine and the specific humidity. Additionally, the intake airflow is controlled by determining a throttle opening of the engine based on the new intake airflow. Further, the intake airflow is controlled by sending the determined throttle opening to the throttle motor. Additionally, the intake airflow is controlled by controlling an opening of the throttle based on the determined throttle opening.

In another exemplary system, the instructions are executable by the computer processor device to determine a first ambient temperature using a temperature sensor of a humidity sensor. Additionally, the instructions are executable by the computer processor to determine a first ambient barometric pressure using a barometric pressure sensor of the humidity sensor. Further, the instructions are executable by the computer processor to determine the specific humidity based on the first ambient temperature and the first ambient barometric pressure. Additionally, the instructions are executable by the computer processor to determine that the humidity sensor is faulty based on the first ambient temperature, a second ambient temperature determined using an engine temperature sensor, the first ambient barometric pressure, and a second ambient barometric pressure determined using an engine barometric pressure sensor. Further, the instructions are executable by the computer processor to determine the specific humidity based on the second ambient temperature and the second ambient barometric pressure.

Various other features, objects, and advantages will be made apparent from the following description taken together with the drawings.

BRIEF DESCRIPTION OF THE DRAWINGS

The present disclosure is described with reference to the following drawings.

DETAILED DESCRIPTION OF THE DRAWINGS

In the present description, certain terms have been used for brevity, clarity and understanding. No unnecessary limitations are to be inferred therefrom beyond the requirement of the prior art because such terms are used for descriptive purposes only and are intended to be broadly construed.

Conventional four-cycle internal combustion engines typically have one or more intake valves for receiving an air/fuel mixture into one or more cylinders. Additionally, these combustion engines typically have one or more exhaust valves for allowing combustion byproducts to escape from the one or more cylinders. One or more spark plugs ignite the air/fuel mixture in the cylinder(s) to move a piston, connecting rod, and crankshaft to provide power to the engine. These components are typically controlled by an engine control module ("ECM"), which controls, among other things, the timing of fuel injection, the amount of fuel to be injected, the timing of the spark, and the throttle opening. The timing of spark may be calibrated during engine set-up and stored (for example in a "map") in a storage unit associated with the ECM. The ECM is configured to control the spark plug(s) according to the map and thus control the timing and amount of combustion in a cylinder, which determines the force exerted on the piston, connecting rod, and crankshaft. Similarly, the throttle opening may be calibrated during engine set-up and stored in a storage unit associated with the ECM. Additionally, the ECM is configured to control the throttle according to the map and control the airflow, and thus oxygen, into the cylinder, which also affects the amount of combustion and force, as described above.

Figure 1:
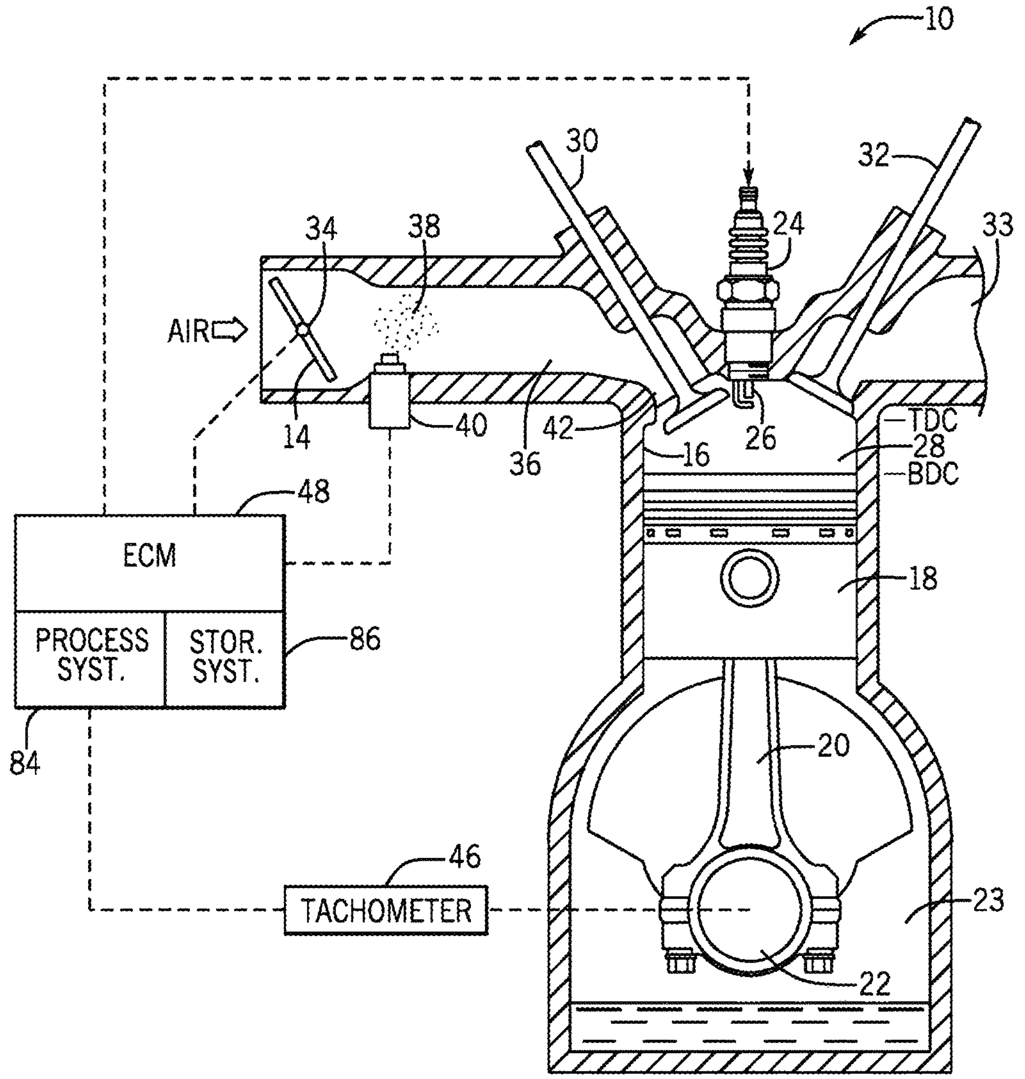
FIG. 1 is a schematic of an exemplary four-cycle internal combustion engine according to the present disclosure.

FIG. 1 is a schematic of an exemplary four-cycle internal combustion engine 10 according to the present disclosure. It should be understood that FIG. 1 is simplified and merely shown to facilitate the below description of the present invention. For example, although only one cylinder 16 is shown, most engines 10 of the type described herein comprise more than one cylinder 16, for example four, six, eight cylinders, or even more.

A piston 18 is located in the cylinder 16 and is operably attached to a connecting rod 20 which, in turn, is operably attached to a crankshaft 22. In use, the crankshaft 22 rotates about an axis within a crankcase 23, which causes the connecting rod 20 to reciprocate the piston 18 between two limits of travel in the cylinder 16. FIG. 1 depicts the piston 18 at its lower-most bottom dead center (BDC) position within the cylinder 16. After the crankshaft 22 rotates 180 degrees about its axis, the piston 18 will move to its uppermost top dead center (TDC) position. A spark plug 24 is configured to provide an igniting spark at its tip 26 to ignite a mixture of fuel and air within the combustion chamber 28.

The engine 10 also has an intake valve 30 and an exhaust valve 32. The intake valve 30 is shown in an open position and the exhaust valve 32 is shown in a closed position. A throttle valve 14 is pivotable about its center 34 in a throttle body structure 12, to regulate the flow of air through an air intake conduit 36 for the engine 10. Fuel 38 is introduced into the air intake conduit 36 via fuel injector 40, for example in the form of a mist. Although the illustrated embodiment is an indirect injection engine 10, the present invention also relates to embodiments of direct injection engines. During operation, the intake air flows through the air intake conduit 36 under the control of the throttle valve 14. Fuel 38 introduced into the intake air passes with the air through an intake port 42, which conducts the resultant air-fuel mixture into the combustion chamber 28. The spark plug 24 fires to ignite the mixture, and after combustion, byproducts are exhausted from combustion chamber 28 through exhaust valve 32 to exhaust conduit 33.

As conventional, the timing of spark in the engine 10 relates to the point, relative to the rotation of the crankshaft 22, when the spark plug 24 is fired to ignite the air-fuel mixture within the combustion chamber 28. If the spark plug 24 is fired before the piston 18 reaches its uppermost position within cylinder 16, it is referred to as being fired before top dead center (BTDC). If the spark plug 24 is fired as the piston 18 is on its way down from its uppermost position in FIG. 1, it is referred to as being fired after top dead center (ATDC). The crankshaft 22 rotates through 360 degrees of rotation as the piston 18 moves through its entire reciprocating motion. It is typical to refer to the timing of events related to combustion within an engine in terms of the crank angle before top dead center (BTDC) or after top dead center (ATDC), with reference to the position of the piston 18 when the event occurs. The timing of the spark may be determined by one or more maps (data tables correlating timing of spark to position of the crankshaft 22 and the humidity level) which as will be further described herein below with reference to FIG. 2, and may be stored in a storage system (memory) of the control system of the engine 10, i.e., the engine control module (ECM). In this invention, the humidity level is but one of several factors used in calculating the ignition timing in either a mapped based or model based control system.

Figure 2:
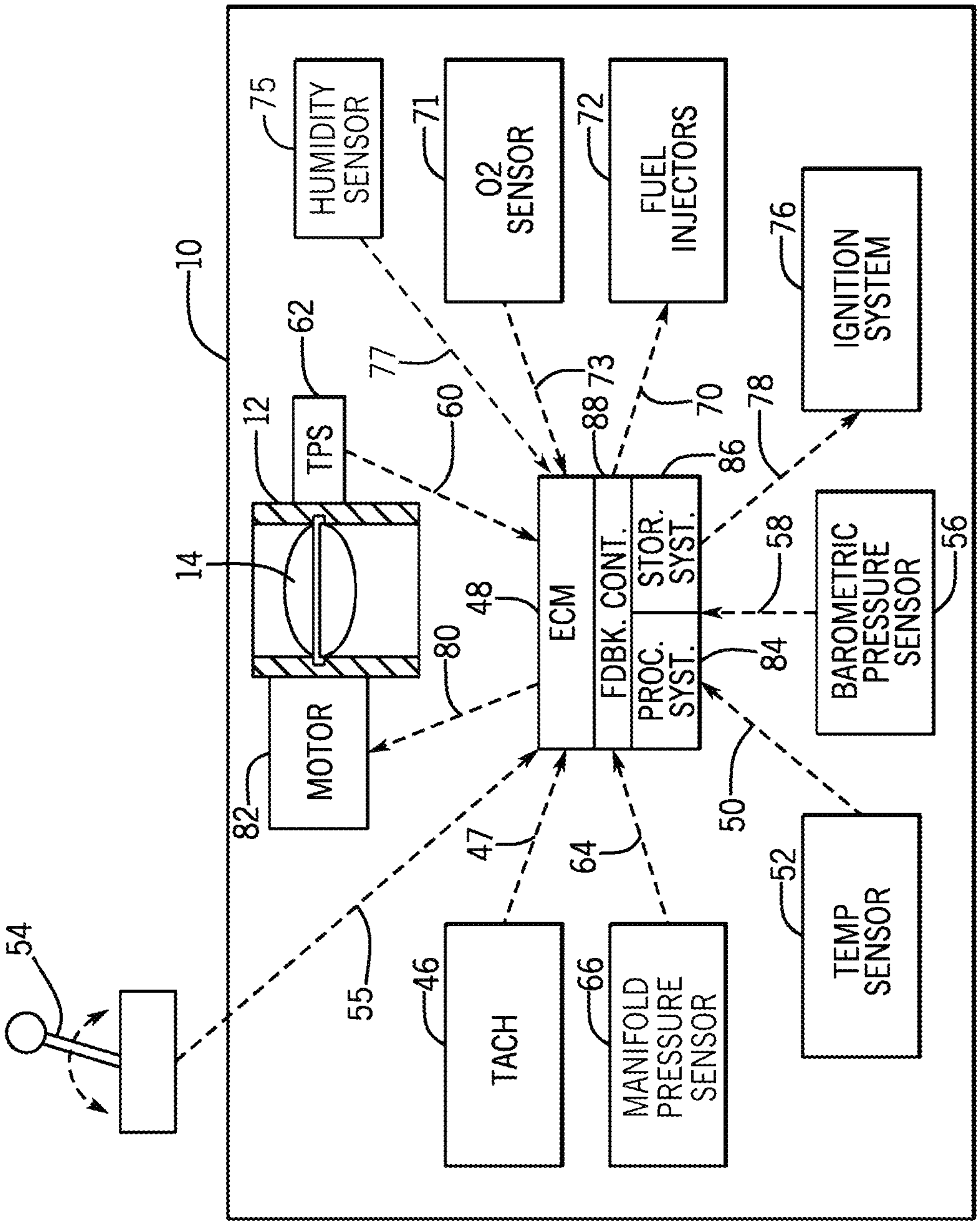
FIG. 2 is a schematic of an exemplary control system for the engine according to the present disclosure.

FIG. 2 is a schematic of an exemplary control system for the engine 10 according to the present disclosure. Referring now to FIGS. 1 and 2, a tachometer (TACH) 46 is connected in signal communication with the crankshaft 22 or some other device, such as a gear tooth wheel, that is connected to the crankshaft 22 to allow the tachometer 46 to measure the crankshaft's rotational speed. Information from the tachometer 46 is provided to the ECM 48, which as further described below, comprises a processor or processing system that digitally stores information that is useful to enable the ECM 48 to control the spark plug timing for the engine 10, and the opening of the throttle valve 14. Accordingly, the ECM 48 may send a signal to an ignition system 76 (described with respect to FIG. 2) or to some other suitable device (e.g., ignition coils, power transistors) to cause the spark plug 24 to fire according to the spark plug timing, determined as described above.

The throttle motor (motor) 82 may cause the throttle valve 14 to pivot about its center of rotation 34 in response to a user command and/or a command from the ECM 48. For example, the motor 82 may move the throttle valve 14 from an open position to a closed position, which may stop the air passing through the air intake conduit 36. In some embodiments, a small amount of air may bypass the plate of the throttle valve 14 during idle engine speed conditions to allow the engine 10 to continue to operate, although at a reduced speed. This reduced flow of air may pass through relatively small holes formed through the throttle valve 14, or through another type of bypass located in the air intake conduit 36. Movement of the throttle valve 14 from the closed position to the open position increases the operational speed of the engine 10, and movement of the throttle valve 14 from the open position to the closed position reduces the operational speed of the engine 10. In some embodiments, the ECM 48 may determine the movement of the throttle valve 14 based on a mapping stored in association with the ECM 48. Alternatively, the ECM 48 may determine the position of the throttle valve 14 based on a modeled calculation.

Additionally, the ECM 48 is connected in signal communication with several sensors. A throttle position sensor 62 provides the ECM 48 with the actual angular position of the throttle valve 14. This information is provided on line 60, and may enable the ECM 48 to control the magnitudes of fuel and air that are provided to each cylinder 16.

Another sensor provides signals to the ECM 48 on line 55 representing the physical position of a throttle lever 54 for operation by the user. The physical position of the throttle lever 54 may informs the ECM 48 of an operator demand for torque (i.e., engine speed). A sensor associated with the tachometer 46 or any other conventional device for sensing engine speed provides the ECM 48 with signals on line 47 representing actual engine speed. Further, a manifold pressure sensor 66 provides the ECM 48 with signals on line 64 representing manifold pressure, such as the pressure in air intake conduit 36. The manifold pressure sensor 66 may be any conventional manifold pressure sensor capable of providing information to the ECM 48 that is representative of manifold absolute pressure. One or more temperature sensors 52 provide the ECM 48 with signals on line 50 representing temperature at one or more selective locations on the engine 10. Various types of conventional temperature sensors are suitable for these purposes. A barometric pressure sensor 56 provides the ECM 48 with signals on line 58 representing ambient barometric pressure. An oxygen (O2) sensor 71 provides signals to the ECM 48 on line 73 representing the amount of oxygen, for example in the engine's exhaust. The oxygen sensor 71 may be a lambda sensor, such as a wide-band oxygen sensor.

Further, the ECM 48 is configured to output signals for controlling operation of the engine 10 and other components related to the engine 10. For example, the ECM 48 provides signals on line 70 to fuel injectors 72 to control the amount of fuel provided to each cylinder 16, per each engine cycle. The ECM 48 also controls the ignition system 76, including the spark plug 24, according to the above-mentioned map stored in the storage system 86, and optionally by determining the actual timing and spark energy of each ignition event. The signals output by the ECM 48 for these purposes are provided on line 78. The ECM 48 may also be configured to control the position of throttle valve 14 via, for example, the motor 82, to actively modify the flow of intake air to the engine 10. The ECM 48 may determine the position of the throttle valve 14 according to the above-mentioned map, or according to a modeled calculation. Further, the ECM 48 may provide signals on line 80 for this purpose.

The ECM 48 may include a feedback controller 88 that uses the readings from the throttle lever 54, tachometer 46, oxygen (O2) sensor 71, throttle position sensor (TPS) 62, the manifold pressure sensor 66 and/or various other sensors to calculate the signals to be sent, for example, via line 80 to throttle motor 82, via line 78 to ignition system 76 (including spark plug 24), and via line 70 to fuel injectors 72, and via other lines to other sensors.

The ECM 48 may be programmable and include a processing system 84 and a storage system 86. The ECM 48 may be located in the engine 10, and/or remote from the engine 10, and can communicate with various components of the engine 10, and/or associated marine drive, and/or marine vessel, via a peripheral interface (not depicted) and wired and/or wireless links (not shown). Although FIG. 2 shows one ECM 48, some embodiments of the present disclosure can include more than one ECM 48. Accordingly, the methods disclosed herein may be carried out by a single ECM 48 or by multiple ECMs. If more than one ECM 48 is provided, each can control operation of one or more devices or sub-systems of the engine 10, and/or associated marine drive and marine vessel.

In some examples, the ECM 48 may include software and input/output (I/O) interfaces for communicating with peripheral devices, such as the tachometer 46, temperature sensor 52, throttle lever 54, barometric pressure sensor 56, throttle position sensor 62, oxygen sensor 71, fuel injectors 72, humidity sensor 75, ignition system 76, and throttle motor 82. In one example, the temperature sensor 52 may be a GE-1856 intake air temperature sensor, which can monitor the temperature of the intake air. Further, such a temperature sensor 52 can provide a signal that is proportional to the temperature of the intake air. Additionally, the temperature sensor 52 can provide this signal as input to the ECM 48, which uses the information provided by the signal to adjust fuel delivery and the air-to-fuel ratio to produce efficient combustion. For example, the barometric pressure sensor 56 may be a Danfoss® DST P100 sensor, which can sense absolute pressure ranging from 0 to 4.5 bar, and gauge pressure ranging from 0 to 50 bar. Additionally, the humidity sensor 75 may be a TRICAN HTD 2800 digital combination sensor, which may provide specific humidity, relative humidity, temperature and barometric pressure. Additionally, the ECM 48 may be implemented in hardware and/or software that includes a programmed set of instructions. For example, the processing system 84 can load and execute software from the storage system 86. This software may direct the processing system 84 to operate as described herein. Additionally, the processing system 84 may include one or more processors, which may be communicatively connected. The processors may comprise a microprocessor, including a control unit and a processing unit, and other circuitry, such as semiconductor hardware logic, that retrieves and executes software (e.g., program instructions) from the storage system. The processing system 84 may be implemented within a single processing device but can also be distributed across multiple processing devices or sub-systems that cooperate according to the program instructions.

Additionally, in some embodiments of the present disclosure, the storage system 86 includes a base spark map (not shown) and a humidity offset map (not shown). The base spark map may identify a spark advance, which may be a value indicating the timing of the spark from the spark plug 24. The base spark map may be based on engine load (e.g., manifold pressure), revolutions per minute (RPM), and a predetermined nominal specific humidity level. The specific humidity may refer to the mass ratio of water to air, and can be represented in grams of water per kilograms of air (g/kg). A nominal specific humidity level (nominal humidity) may represent a typical ambient condition of marine vessel operation (e.g., 9 g/kg). As such, to determine when to fire the spark plug 24, the ECM 48 may use the base spark map to determine the spark advance. Accordingly, in nominal humidity, the ECM 48 may control the spark plug timing using the spark advance identified from the base spark map. However, when operating conditions do not match the predetermined nominal humidity, the ECM 48 may use the humidity offset map to determine a new spark advance. According to some embodiments, the humidity offset map may be based on engine load and specific humidity. Using engine load and specific humidity, the ECM 48 may identify an offset in the humidity offset table. Further, the ECM 48 may determine a new spark advance value by adding or subtracting the identified offset to, or from, the identified spark advance from the base spark map. Thus, the ECM 48 may control the spark plug timing using the new spark advance value. According to some embodiments, the values in the humidity offset map may be limited to a predetermined range of values. This limit may be useful in the event of a humidity sensor fault, wherein using a faulty humidity value may provide an offset that varies spark timing so far from norms that engine performance may suffer, or the engine 10 itself may be damaged.

Further, in some embodiments, instead of using base spark and humidity offset maps as described above, the ECM 48 may determine the spark advance using a modeled calculation based on the engine load, RPM, and specific humidity level. Alternatively, the ECM 48 may determine the spark advance using some combination of maps and modeled calculations. For example, the ECM 48 may determine a base spark advance using a modeled calculation for nominal humidity, in combination with a humidity offset table. Further combinations are also possible, such as the base spark map and a modeled calculation for the humidity offset.

As used herein, the terms, "control module," and, "computer processor device," may refer to an application specific integrated circuit (ASIC); an electronic circuit; a combinational logic circuit; a field programmable gate array (FPGA); a processor (shared, dedicated, or group) that executes code; other suitable components that provide the described functionality; or, a combination of some or all of the above, such as in a system-on-chip (SoC). Further, the ECM 48 may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term, "group," means that some or all code from a single control module may be executed using a group of processors. In addition, some or all code from a single control module may be stored using a group of memories.

The storage system 86 may comprise any storage media readable and writeable by the processing system 84, and capable of storing software, data, and the like. The storage system 86 may include volatile and non-volatile, removable and non-removable media implemented in any method or technology for storage of information, such as computer-readable instructions, data structures, software program modules, other data, and the like. The storage system 86 may be implemented as a single storage device or across multiple storage devices or sub-systems. The storage system 86 may include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which may be used to store the desired information and that may be accessed by an instruction execution system. The storage media may be a transitory storage media or a non-transitory storage media such as a non-transitory, tangible, computer readable medium.

The ECM 48 is configured to communicate with one or more components of the control system via I/O interfaces and a communication link, which may be a wired or wireless link, and is shown schematically by lines 55, 47, 64, 50, 58, 78, 70, 73, 60, and 80. The ECM 48 is thus capable of monitoring and controlling one or more operational characteristics of the control system, and its various subsystems, by sending and receiving control signals via the communication link. In some examples, the communication link is a controller area network (CAN) bus, however other types of links could be used. It should be noted that the extent of connections of the communication link shown herein is for schematic purposes only, and the communication link may provide communication between the ECM 48 and each of the peripheral devices and sensors noted herein, although not every connection is shown in the drawings, for purposes of clarity.

Figure 3:
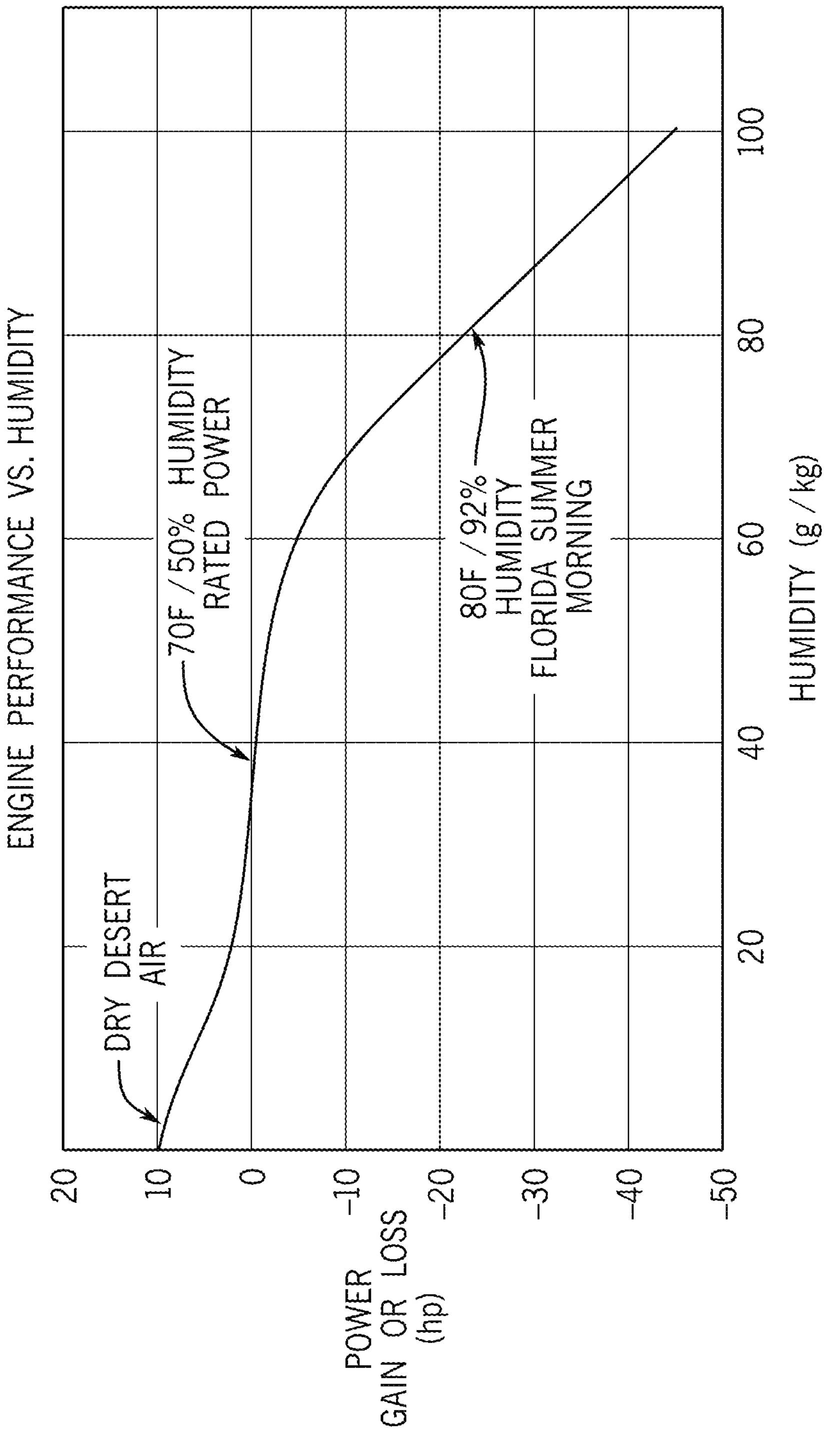
FIG. 3 is a graph illustrating engine performance versus humidity during application of a constant base spark map as calibrated by the manufacturer.

FIG. 3 is a graph illustrating engine performance versus humidity during application of a constant base spark map, for example, as calibrated by the manufacturer. Referring to FIG. 3, the present disclosure stems from the inventors' realization that it would be advantageous to provide improved systems and methods for controlling the above-described combustion processes in a manner that reduces the negative effects of humidity (e.g., water content of the intake air) on performance of the engine 10. Through research and experimentation, the present inventors determined that engine combustion is impacted by the mass ratio of water to air (often referred to as specific humidity, and expressed in grams of water per kilograms of air (g/kg)). As the amount of water in the air increases, this water displaces oxygen, which slows combustion, thus resulting in less power output, and lower performance by the engine 10. More specifically, as the ratio of water in the air increases, the combustion becomes cooler (and thus, less powerful), and the burn rate of the combustion becomes slower and more irregular. As such, cycle-to-cycle variation of combustion increases. Conversely, as the amount of water in the intake air decreases, the amount of oxygen increases, which speeds up the combustion rate, and results in more power output. However, the increased power output can also cause irregular combustion (and, for example, knock, which can damage the engine 10). Through research and development, the present inventors have determined that it would be advantageous to provide improved systems and methods which modify operation of the engine 10, particularly by advancing or retarding the spark advance and/or by modifying the flow of intake air into the engine 10 based on the specific humidity of the intake air, thus maintaining more consistent and useful power output of the engine 10.

The constant base spark map may indicate the specific spark plug timing based on the load and the revolutions per minute (RPM) of the engine 10. The constant base spark map may be constant with respect to the spark plug timing remaining constant regardless of the humidity level. In the graph of FIG. 3, the X-axis represents the specific humidity level in grams of water per kilogram of air (g/kg), and the Y-axis represents power gain or loss in horsepower (hp). In this way, the graph illustrates how performance is positively and negatively impacted at various levels of specific humidity. More specifically, the graph shows a power gain in relatively dry air conditions (e.g., specific humidity between 0 and approximately 30 g/kg), no gain or loss when the specific humidity is between approximately 30 and 40 g/kg (representing a relative humidity of 50% at 70 degrees Fahrenheit), and an increasing power loss as specific humidity increases between 40 and 100 g/kg. The graph gives the specific example of a specific humidity of approximately 80 g/kg representing a relative humidity of 92% at 80 degrees Fahrenheit.

Figure 4:
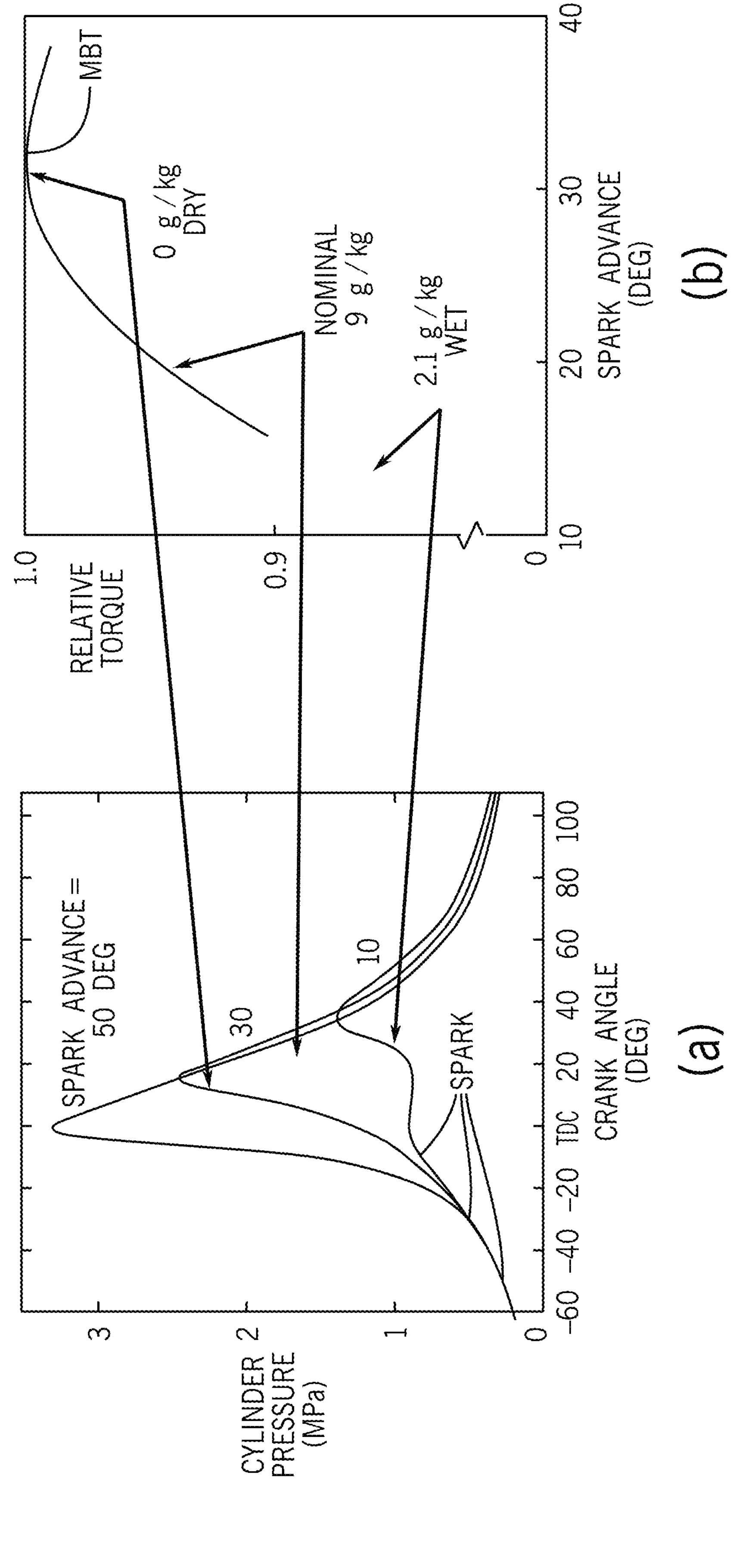
FIG. 4 is two graphs illustrating the effect of humidity on pressure and relative torque.

FIG. 4 has two graphs illustrating the effect of humidity on pressure and relative torque. Graph (a) demonstrates the relationship between spark advance and the cylinder pressure generated by the resulting combustion. As stated previously, spark advance is a reference to the timing of the spark plug 24 firing. For example, spark advance can be represented in terms of the angle of the crankshaft is positioned in its 360 degrees of rotation (i.e., −180 degrees to +180 degrees) when the spark plug 24 fires. Accordingly, the X-axis represents spark advance with respect to the crankshaft angle in degrees (deg), where TDC represents 0 degrees. Negative degrees of spark advance can indicate the time before the crankshaft reaches top dead center (TDC).

Conversely, positive degrees of spark advance can indicate the time after the crankshaft reaches TDC.

Additionally, the Y-axis represents the cylinder pressure in MegaPascal (MPa). The MegaPascal units represent units of pressure. For example, 1 MPa is equal to 145 pounds per square inch (psi). Each curve in this graph represents the pressure generated by the combustion resulting from different spark advances, with the corresponding spark advance of each curve represented by the points indicated by the "Ignition," label. For example, the curve with the greatest pressure peak (at approximately 3 MPa), results from a spark advance of 50 degrees (−50). The curve with the next highest peak results from a spark advance of 30 degrees (−30). Further, the curve with the lowest peak results from a spark advance of 10 degrees (−10).

Graph (b) represents the relationship between spark advance and relative torque. In graph (b), the X-axis represents the spark advance in positive values of degrees. Similar to graph (a), the spark advance in graph (b) is represented in terms of degrees of rotation of the crankshaft. However, conversely from graph (a), the positive values of spark advance in graph (b) indicate the negative degrees of rotation from graph (a). Thus, +20 degrees of spark advance in graph (b) is equal to −20 degrees of spark advance in graph (a).

Further, in graph (b), the Y-axis represents the relative torque. Relative torque is a reference to the amount of pressure applied to the crankshaft by the cylinder piston from the combustion. In graph (b), relative torque is represented on a scale from 0 to 1.0, with 0 representing no torque, and 1.0 representing the maximum amount of torque (e.g., mean best torque (MBT)). As shown, the amount of relative torque increases as the spark advance increases from 10 to approximately 30 degrees, and relative torque decreases as spark advance increases beyond 30 degrees.

Further, FIG. 4 includes 3 lines connecting points on the curve of graph (b) to points in graph (a). Additionally, each of these lines is labeled with a specific humidity indicator. Accordingly, these lines may indicate the relative effect of ignition timing or the humidity level on torque reduction as the humidity level increases from dry conditions. For example, the line between graph (b)'s relative torque of 1.0 (at 30 degrees of spark advance) and the corresponding point on graph (a) (at approximately +15 degrees of spark advance and 2 MPa) is labeled, 0 g/kg "Dry." Further, the line between graph (b)'s relative torque of approximately 0.95 and the corresponding point on graph (a) (at approximately +20 degrees of spark advance and 1.5 MPa) is labeled, 9 g/kg "Nominal." Additionally, the line between graph (b)'s relative torque of approximately 0.5 and the corresponding point in graph (a) (at approximately +25 degrees of spark advance and 1 MPa) is labeled, 2.1 g/kg "Wet."

The present inventors found that the above-described effects of changes in humidity are more pronounced in supercharged engines having later-than-optimized spark plug timing for managing peak cylinder pressure (power). Further, the slower burn rate resulting from humidity nets additional unburned hydrocarbons to the exhaust gases. Accordingly, the resulting reduced power negatively impacts specific emissions, which may be measured in grams of emissions per kilowatt hour. The inventors found that the opposite is true for drier-than-nominal air. As burn rate increases, peak cylinder pressure rises quickly. This nets an increase in NOx generation due to the higher combustion temperatures without a significant increase in power to balance the specific emissions. Additionally, the reduction in power in high humidity conditions is a dissatisfies from a user standpoint.

Figure 5:
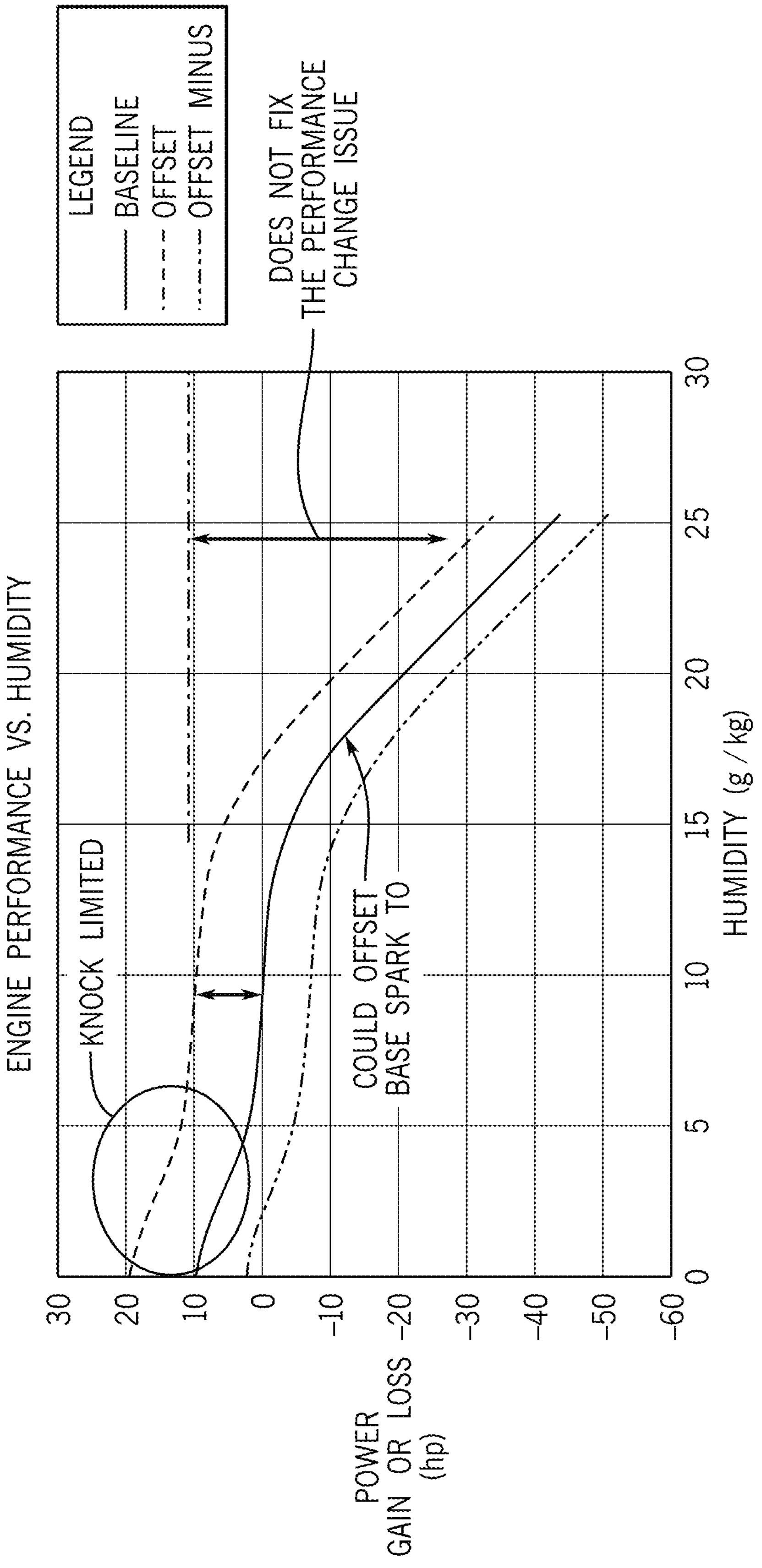
FIG. 5 is a graph illustrating engine performance vs. humidity, denoting effects of offsetting a base spark to account for humidity.

FIG. 5 is a graph illustrating engine performance vs. humidity, denoting effects of offsetting a base spark to account for humidity. The present inventors also realized that one could configure the ECM 48 to operate based on a spark map which is modified from the constant base spark map, in a manner that accounts for some of the power loss (or gain). This was found to reduce, but not effectively mitigate the performance loss caused by, for example, the change from a nominal level to a relatively high level of humidity. In FIG. 5, the X-axis illustrates humidity level and the Y-axis illustrates power gain or loss. The solid line illustrates engine performance according to the base spark map. The dashed lines on either side of the solid line illustrate engine performance according to modified (advanced/retarded) spark maps. The higher dotted line represents the effect of advancing spark (increasing the timing delay), while the lower dotted line represent the effect of retarding spark (decrease the timing delay). However, as shown, an engine configured for increased power on a normal to moderate humidity day would still encounter performance loss on a relatively higher humidity day. In addition, the peak power would be limited by multiple other factors like maximum cylinder pressure and emissions. Thus, for an advanced offset base spark map on dry days, the propensity for cylinder knock would also be increased. This would disadvantageously implicate a shift to more expensive premium fuel, or the additional cost of installing a knock system to mitigate engine damage. Even a baseline spark map for a high-performance calibration may result in engine knock on extreme dry and high barometer days.

The present inventors also realized that compensation for performance loss in a supercharged engine could be accomplished by increasing boost pressure, however this would also cause the above-described negative feedback loop of late spark, slow burn rates, and higher sensitivity to humidity, as well as lower engine efficiency and fuel economy.

Figure 6:
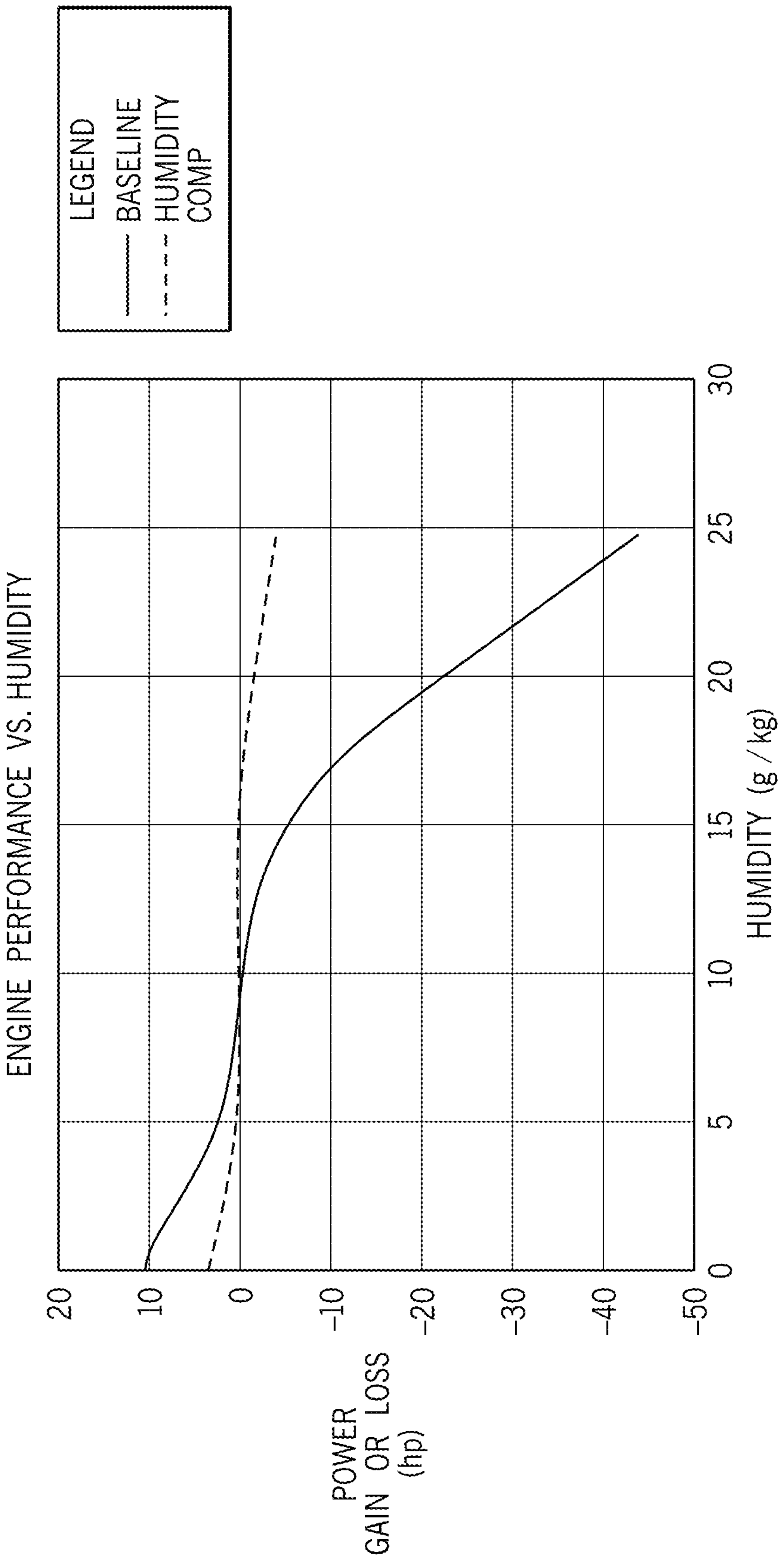
FIG. 6 is a graph illustrating engine performance vs. humidity, denoting effects of modifying spark plug timing based on varying levels of humidity, according to the present disclosure.

FIG. 6 is a graph illustrating engine performance vs. humidity, denoting effects of modifying spark plug timing based on varying levels of humidity, according to the present disclosure. According to the present disclosure, the present inventors determined that it is advantageously possible to more efficiently and effectively correct the above-described issues caused by humidity by configuring the system and ECM 48 to periodically or continuously monitor humidity of the intake air and actively modify spark as the humidity changes to thereby mitigate changes in cylinder pressure and maintain consistently efficient engine performance.

As described with respect to FIG. 2, the engine 10 includes a humidity sensor 75 which provides the ECU 48 with signals representing the specific humidity (moisture content) of the intake air. According to the present disclosure, the ECM 48 is configured to control the timing of spark based upon a base spark map, and a humidity offset map. The base spark map and humidity offset map may be stored in the storage system 86 and the ECM 48 can be configured to monitor humidity and modify operation of the spark plug timing based on the base spark and humidity offset maps in real time, or periodically. In non-limiting embodiments, based on the humidity offset map, the ECM 48 is configured to reduce the spark advance when the specific humidity is dryer than a nominal value. The nominal value may be a level of specific humidity for which the spark plug timing of a particular engine is calibrated. Reducing the spark advance in these dryer conditions may help maintain knock margin and limit an overall increase in peak cylinder pressure. In this way, embodiments of the present disclosure may enable operation of the engine 10 with a lower performance fuel, which reduces fuel costs, and reduce nitrous oxide (NOx) emissions from the combustion. Alternatively, when specific humidity is higher than nominal, the ECM 48 may increase spark advance based on the humidity offset map. In this way, embodiments of the present disclosure may maintain target cylinder pressure and performance. Additionally, increasing spark advance in these wetter conditions may enable the engine to burn more of the fuel, thus advantageously improving fuel economy and reducing carry-over hydrocarbons in the exhaust gas. Further, in this way, embodiments of the present disclosure may maintain generally consistent power (represented in kilowatts [kw]) and emissions (represented in grams per kw hour [g/kw—hr]). Thus, reducing the spark advance in dryer than nominal specific humidity, and increasing the spark advance in wetter than nominal specific humidity may facilitate a more efficient spark timing, thereby improving fuel economy and reducing emissions.

Figure 7:
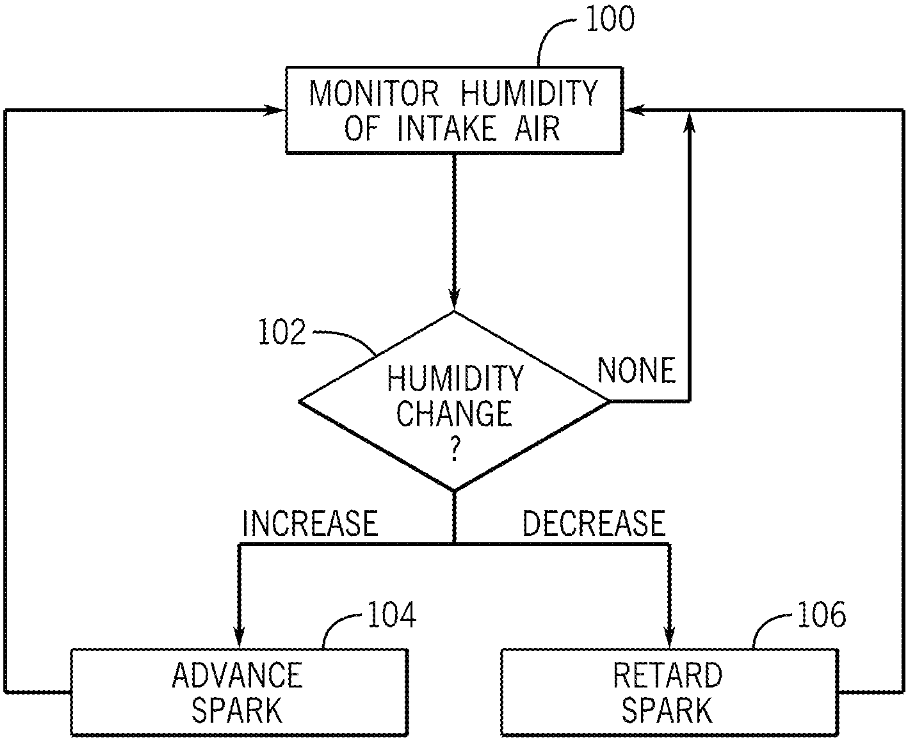
FIG. 7 is a flowchart of an example method for controlling combustion in an engine of a marine drive according to the present disclosure.

FIG. 7 is a flowchart of an example method for controlling combustion in the engine 10 of a marine drive according to the present disclosure. The ECM 48 may perform this method. At operation 100, the ECM 48 monitors the specific humidity of the intake air via one or more signals from the humidity sensor 75. At operation 102, the ECM 48 may compare the monitored humidity to a nominal humidity value stored in the storage system 86. If the ECM 48 determines that the humidity has not changed by at least a predetermined amount, the method periodically or continuously repeats operation 102. For example, the ECM 48 may perform a lookup in the humidity offset map based on engine load and specific humidity. If the offset value is 0 for the current engine load and specific humidity, the specific humidity is unchanged, and the method may repeat operation 102. However, if the ECM 48 determines that humidity has decreased (or increased) by a predetermined amount, the ECM 48 may change the spark plug timing using the above-noted base spark and humidity maps to either retard spark plug timing under drier than nominal conditions at operation 104, or advance spark plug timing under more humid than nominal conditions at operation 106. More specifically, the ECM 48 may use the base spark map to determine a spark advance value. Additionally, the ECM 48 may use the humidity offset map to determine an offset value. Further, the ECM 48 may determine a new spark advance value using the spark advance value from the base spark map, and the offset value from the humidity offset map. For example, under drier than nominal humidity, the offset value may be a negative numeric value. In contrast, under wetter than nominal humidity, the offset value may be a positive numeric value. Accordingly, the ECM 48 may determine the new spark advance value by adding the offset value from the humidity offset map to the spark advance value from the base spark map. Additionally, the ECM 48 may provide the new spark advance value to the ignition system 76, which may initiate future spark plug sparks based on the new spark advance value. The method then begins again, either continuously or periodically at operation 102. In some examples, the ECM 48 may be configured to stop varying timing of spark once the humidity varies from standard by more than a certain amount because the benefits of doing so decrease at the outermost limits of humidity (i.e., very dry or very wet). For example, the humidity offset map may include zero values for these outermost limits.

The present inventors also realized that according to the above examples and/or in other examples, the ECM 48 may be configured to operate, for example, based on a throttle position map which is modified from a base throttle position map, in a manner that accounts for the power loss (or gain) caused by changes in the specific humidity of intake air. For example, the ECM 48 may be configured to modify the flow of intake air based on the specific humidity. More specifically, the ECM 48 may be configured to increase the flow of intake air when the humidity increases to greater than nominal, and to retard the flow of intake air when the humidity decreases to lower than nominal. Corresponding methods for controlling combustion in an engine of a marine drive would generally follow the steps of FIG. 7, except instead of or in addition to modifying the timing of spark, the flow of intake air (via positioning of the throttle valve 14) may be modified based on the specific humidity.

Figure 8:
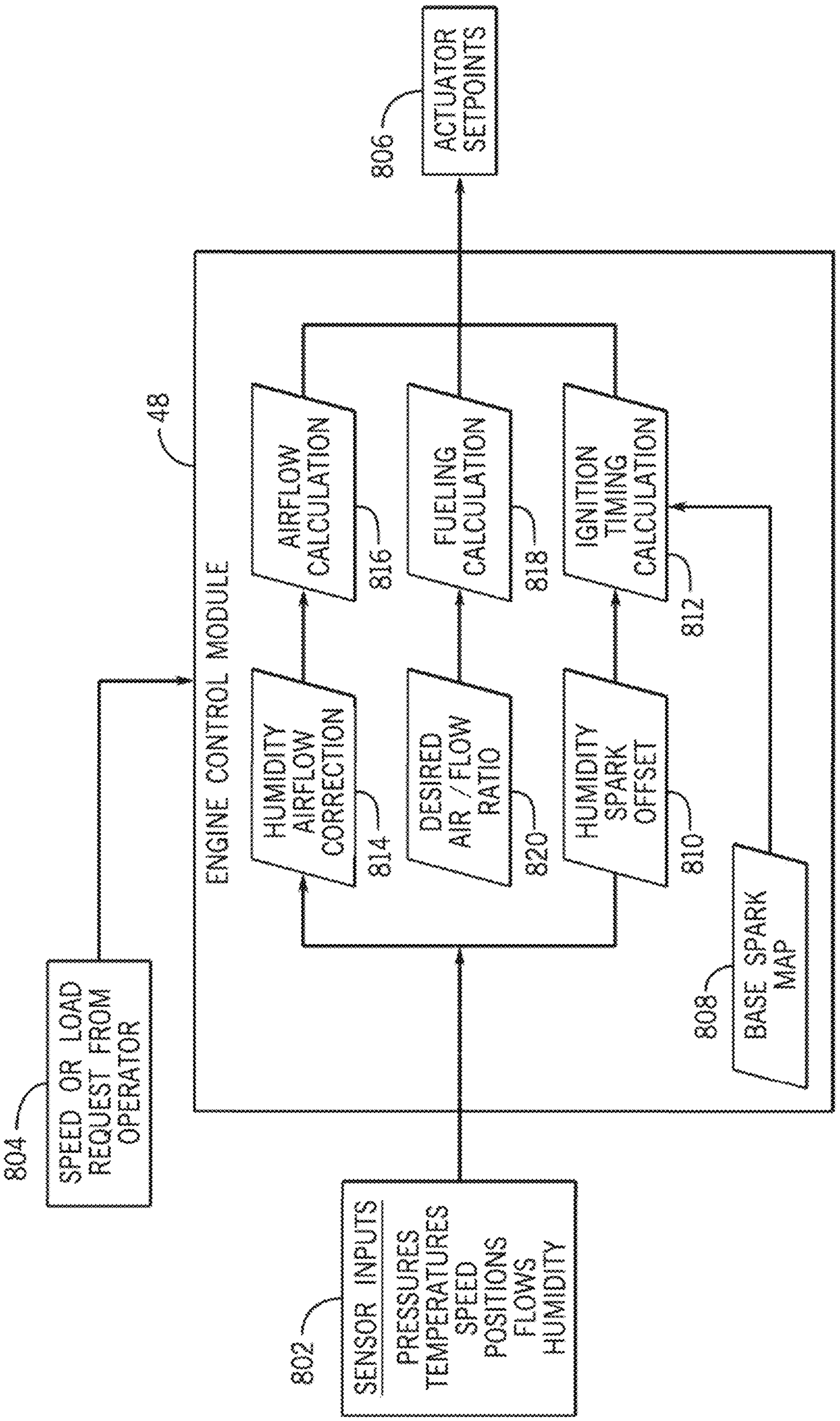
FIG. 8 is a data flow diagram for controlling combustion in an engine of a marine drive according to the present disclosure.

FIG. 8 is a data flow diagram for controlling combustion in the engine 10 of a marine drive according to the present disclosure. In this example, the ECM 48 receives sensor inputs 802 from the sensors described with respect to FIG. 2. Specifically, the sensor inputs 802 may include system pressures, temperatures, speed, positions (e.g. throttle position), flows, and specific humidity of the intake air. Additionally, the ECM 48 may receive speed or load requests 804 from an operator of the system and/or based upon a programming of the ECM 48. Further, based on the sensor inputs 802 and requests 804, the ECM 48 may be configured in the manner described herein above, to modify existing base map(s) either or both of the flow of intake air and the timing of spark to achieve a desired air/fuel ratio and thus determine the actuator setpoints 806.

For example, the ECM 48 may use the sensor inputs 802, requests 804, a base spark map 808, and humidity offset map 810 as inputs to an ignition timing calculation 812. For the ignition timing calculation 812, the ECM 48 may determine a base spark advance value that is based on the engine load (e.g., intake manifold pressure and operator load request) and the RPM value (e.g., operator speed request). Additionally, the ECM 48 may determine a spark advance offset value from the humidity offset map 810 based on the engine load and the specific humidity value. According to the present disclosure, the humidity offset map may include negative values for drier than nominal conditions, thus retarding spark advance. Conversely, the humidity offset map may include positive values for wetter than nominal conditions, thus advancing spark plug advance. Further, the ECM 48 may provide a calculated spark advance value for the actuator setpoints 806 that is equal to the sum of the spark advance value from the base spark map 808 and the offset value from the humidity offset map 810.

Further, the ECM 48 may use the sensor inputs 802, requests 804, and a humidity airflow correction 814 as inputs to an airflow calculation 816 that may compensate for the greater amount of oxygen in dryer (than nominal) air, or the lesser amount of oxygen in wetter (than nominal) air. In this way, embodiments of the present disclosure may enable the engine 10 to use a consistent amount of oxygen, given a current speed (from sensor inputs 802), operator request for power (from requests 804), and the specifications of the particular engine 10. In some embodiments of the present disclosure, the humidity airflow correction 814 may be a map that identifies a mass airflow offset based on the specific humidity, speed, and power request. Accordingly, in the airflow calculation 816, the ECM 48 may calculate the mass airflow, and hence the setpoint for the throttle valve 14 position, based on the speed, power request, and mass airflow offset. Further, the ECM 48 may provide the throttle valve position setpoint to the actuator setpoints 806. Additionally, the ECM 48 may provide the value of the calculated airflow, along with the desired air/fuel ratio 818 for the fueling calculation 820. In the fueling calculation, the ECM 48 may determine the fuel injector setpoint, and provide this setpoint for the actuator setpoints 806.

Figure 9:
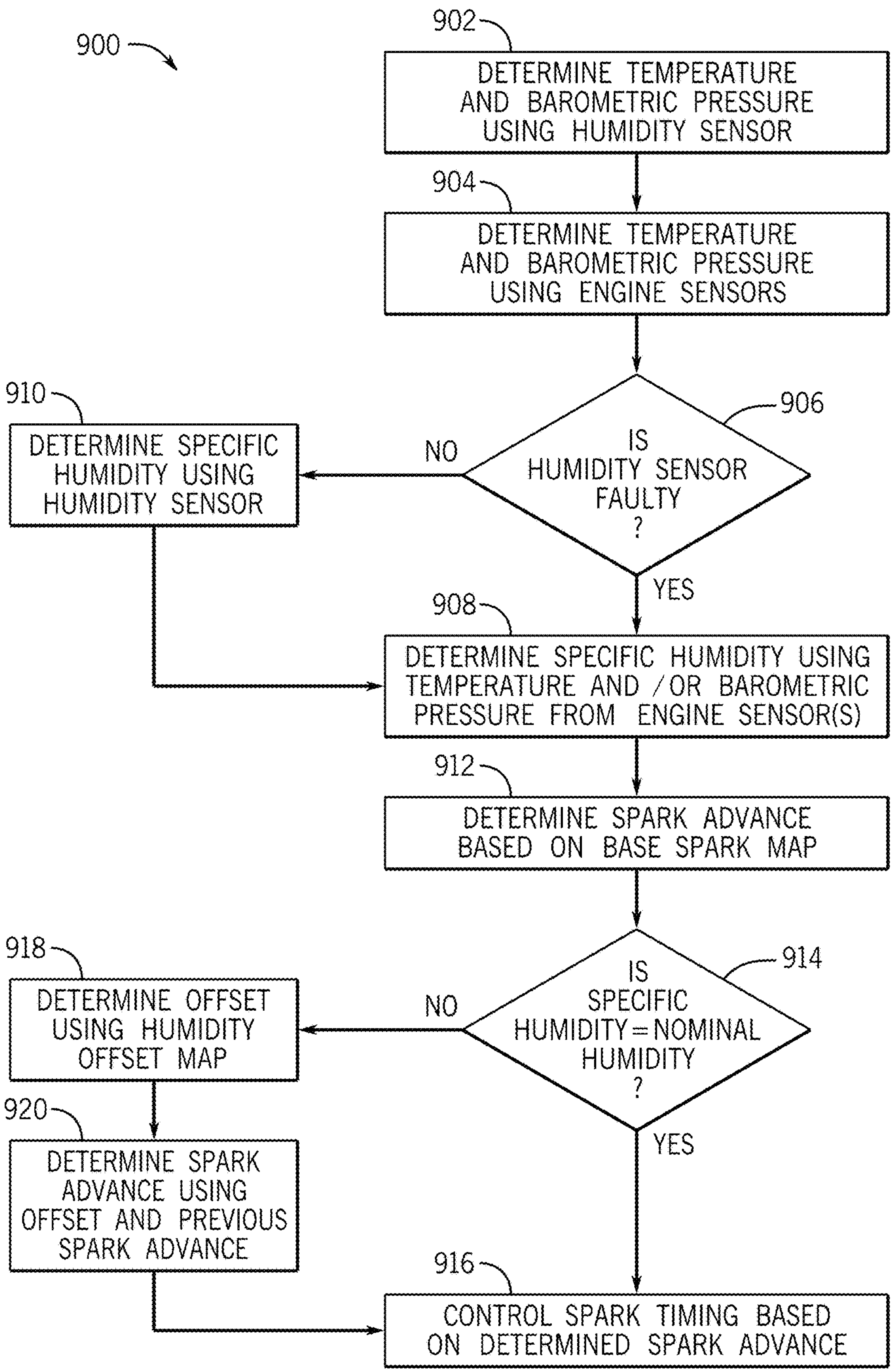
FIG. 9 is a flowchart of an example method for controlling combustion in an engine of a marine drive according to the present disclosure.

FIG. 9 is a flowchart of an example method 900 for controlling combustion in the engine 10 of a marine drive according to the present disclosure. The ECM 48 may perform the method 900. In non-limiting examples, the humidity sensor 75 is configured to sense specific humidity by sensing atmospheric (e.g., barometric) pressure and temperature, in addition to sensing moisture, and determining the specific humidity as a function of these sensed values. Further, the humidity sensor 75 may output the barometric pressure, temperature, and specific humidity, to the ECM 48 via line 77. In these examples, the present inventors further realized that with the addition of such a sensor 75 to the system it is advantageously possible to also configure the ECM 48 to compare the pressure and temperature sensed by the humidity sensor 75 to the pressure and temperature sensed by the engine barometric pressure sensor 56 and temperature sensor 52, as a way to double check the functionality of both sensors—i.e., to make sure the sensors are performing correctly. If there is a larger than expected difference between the pressures sensed by sensors 56, 75, the ECM 48 may be configured to determine a fault in at least one of the sensors and provide an alert or take other corrective action. In a similar manner, if there is a larger than expected difference between the temperatures sensed by sensors 52, 75, the ECM 48 may be configured to determine a fault in at least one of the sensors and provide an alert or take other corrective action. For example, the sensors each have their own diagnostic limits. If the sensor is shorted or open circuit, the ECM 48 identifies the sensor as being faulty. In addition, the primary method described here to identify which one is correct if they are both within a valid range also uses modeled expected values in the ECM 48 for the current running conditions. The ECM 48 looks at the various other sensors and actuators in the engine along with comparing the sensors in question to logically determine which sensor is not faulty, and use its values accordingly.

For example, at operation 902, the ECM 48 may determine the temperature and barometric pressure using the humidity sensor 75. Further, the humidity sensor 75 may determine the specific humidity based on temperature and barometric pressure. Accordingly, the humidity sensor 75 may include its own sensors for temperature and barometric pressure, which the ECM 48 may determine using the signals received from the humidity sensor 75.

At operation 904, the ECM 48 may determine the temperature and barometric pressure using the engine sensors. More specifically, the ECM 48 may determine the temperature using signals from the temperature sensor 52. Additionally, the ECM 48 may determine the barometric pressure using signals from the barometric pressure sensor 56.

At operation 906, the ECM 48 may determine if the humidity sensor is faulty. More specifically, the ECM 48 may compare the temperature from the engine sensors (i.e., temperature sensor 52, barometric pressure sensor 56) to the temperature and barometric pressure from the humidity sensor 75. If there is a difference between the temperature and/or barometric pressure values, the ECM 48 may use the sensors' diagnostic limits to determine if the humidity sensor 75 is shorted or open circuit, i.e., faulty. However, if the humidity sensor 75, temperature sensor 52, and barometric pressure sensor 56 within the valid ranges of their diagnostic limits, the ECM 48 may identify a faulty sensor by using modeled expected values in the ECM 48 for the current running conditions. The ECM 48 also may looks at the various other sensors and actuators in the engine 10 along with comparing the sensors in question to logically determine which sensor is not faulty. If there is a fault in the humidity sensor, the method 900 may flow to operation 908.

At operation 908, the ECM 48 may determine the specific humidity using the temperature and barometric pressure values from the temperature sensor 52 and barometric pressure sensor 56. However, if there is not a fault in the humidity sensor, the method 900 may flow from operations 906 to operation 910.

At operation 910, the ECM 48 may determine the specific humidity value provided by the humidity sensor 75. After either of operation 908 or 910, the method may flow to operation 912.

At operation 912, the ECM 48 may determine the spark advance using the base spark map. More specifically, the ECM 48 may determine the spark advance by identifying the spark advance value in the base spark map, based on the engine load and RPM. The engine load and RPM may be provided for the ECM 48 by the manifold pressure sensor 66, throttle lever 54, and tachometer 46.

At operation 914, the ECM 48 may determine if the specific humidity is equal to the nominal humidity. If the specific humidity is equal to the nominal humidity, the method 900 may flow to operation 916. However, if the specific humidity is not equal to the nominal humidity, the method 900 flows to operation 918.

At operation 916, the ECM 48 may control the spark timing based on the determined spark advance. As stated previously, the base spark map may calibrate the spark advance value based on a predetermined nominal humidity value. As such, if the specific humidity is equal to the nominal humidity, the ECM 48 may control the spark timing based on the spark advance value from the base spark map. However, if the specific humidity is not equal to the nominal humidity, the ECM 48 may control the spark timing based on the spark advance value determine at operation 920.

At operation 918, the ECM 48 may determine an offset using the humidity offset map. More specifically, the ECM 48 may identify a spark advance offset in the humidity offset map, based on the engine load and specific humidity.

At operation 920, the ECM 48 may determine the spark advance value based on the spark advance offset from the humidity offset map and the spark advance value from the base spark map. The method 900 may then flow to operation 916, where the spark advance value determined at operation 920 is used to control the spark timing.

Figure 10:
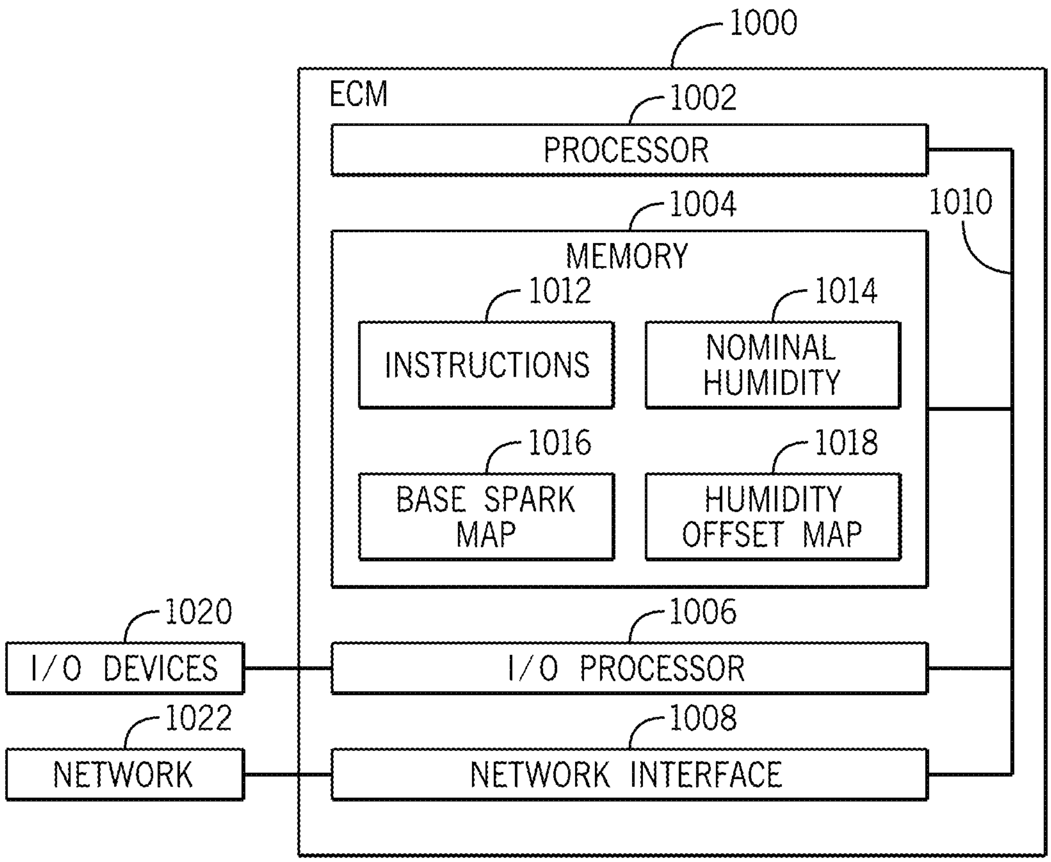
FIG. 10 is a diagram of an example engine control module (ECM) according to the present disclosure.

FIG. 10 is a diagram of an example engine control module (ECM) 1000 according to the present disclosure. The example ECM 1000 may be similar to the ECM 48, described with respect to FIGS. 1, 2, and 7-9, which controls the spark plug timing of the engine 10, and the opening of the throttle valve 14 as described herein. In this example, the ECM 1000 includes a processor 1002, memory 1004, input-output (I/O) interface 1006, and network interface 1008, which may be connected by an interconnect 1010. The processor 1002 may be a computer processing circuit (e.g., a central processing unit (CPU)) that retrieves and executes programming instructions 1012 stored in the memory 1004 to perform the functionality described herein. The interconnect 1010 may move data, such as programming instructions, between the processor 1002, memory 1004, I/O interface 1006, and network interface 1008. The interconnect 1010 may include one or more busses.

The memory 1004 may be a computer memory or storage device, including volatile memory, such as a random access memory (RAM) device (e.g., static RAM, dynamic RAM, and the like), non-volatile memory, such as a hard disk drive, solid state device (SSD), removable memory cards, optical storage, flash memory devices, and the like. In some examples, the memory 1004 may include volatile and non-volatile memory devices. According to some embodiments, the memory 1004 stores the instructions 1012, nominal humidity 1014, base spark map 1016, and humidity offset map 1018.

Additionally, the ECM 1000 may be in electronic communication with I/O devices 1020 through the I/O interface 1006, and with a network 1022 through the network interface 1008. The I/O devices 1020 may include the components described with respect to FIG. 2, such as the throttle lever 54, sensors, ignition system 76, throttle motor 82, and the like. Additionally, the I/O devices 1020 may include a display device, which may be used to provide alerts about sensor faults, as described with respect to FIGS. 8 and 9. Accordingly, the operator may engage or otherwise manipulate the I/O devices 1020 in the manners described with respect to FIG. 2. Additionally, the ECM 48 may use the display devices in the manners described with respect to FIGS. 8 and 9. The network 1022 may be an electronic communication network, such as a controller area network (CAN), for processing communications between the ECM 1000 and the components of the engine 10, as described with respect to FIGS. 1, 2, and 7-9. In some examples, the network 1022 may be wired, wireless (e.g., wi-fi, Bluetooth, or cellular), or some other computer communication network.

In some embodiments, the ECM 1000 may be a server computer or similar device without a user interface but which receives requests from other computer systems having one or more user interfaces. Further, in some embodiments, the ECM 1000 may be a portable computer, laptop, tablet computer, pocket computer, telephone, smart phone, or the like.

A non-limiting list of examples is provided hereinafter to demonstrate some aspects of the present disclosure. Example 1 is a system for controlling combustion in an engine of a marine drive. This example can include a computer processor device, and a computer memory device comprising instructions that are executable by the computer processor device to control a timing of spark in an engine. The timing of spark is controlled by determining a base spark advance based on a predetermined nominal humidity, a load of the engine, and a revolutions per minute (RPM) value of the engine. Additionally, the timing of spark is controlled by determining a humidity offset value based on a specific humidity of intake air to the engine and the load of the engine. Further, the timing of spark is controlled by determining a controlling spark advance value based on the base spark advance and the humidity offset value. Additionally, the timing of spark is controlled by sending the controlling spark advance value to an ignition system of the engine.

Example 2 includes the system of example 1, including or excluding optional features. In this example, determining the base spark advance involves performing a lookup in a base spark map. The base spark map maps the base spark advance to the predetermined nominal humidity, the load, and the RPM value.

Example 3 includes the system of example 1, including or excluding optional features. In this example, determining the humidity offset value comprises performing a lookup in a humidity offset map, wherein the humidity offset map maps the humidity offset value to the specific humidity and the load.

Example 4 includes the system of example 1, including or excluding optional features. In this example, the timing of the spark in the engine is controlled by determining the spark advance for the spark plug in response to a change in the load of the engine.

Example 5 includes the system of example 1, including or excluding optional features. In this example, an intake airflow of the engine is controlled by determining a new intake airflow based on the load of the engine and the specific humidity. Additionally, the intake airflow is controlled by determining a throttle opening of the engine based on the new intake airflow. Further, the intake airflow is controlled by sending the determined throttle opening to the throttle motor.

Example 6 includes the system of example 1, including or excluding optional features. In this example, the specific humidity is determined by determining a first ambient temperature using a temperature sensor of a humidity sensor. Additionally, the specific humidity is determined by determining a first ambient barometric pressure using a barometric pressure sensor of the humidity sensor. Further, the specific humidity is determined by determining the specific humidity based on the first ambient temperature and the first ambient barometric pressure.

Example 7 includes the system of example 6, including or excluding optional features. In this example, the instructions are executable by the computer processor device to determine that the humidity sensor is faulty based on the first ambient temperature and a second ambient temperature determined using an engine temperature sensor. Further, the instructions are executable by the computer processor device to determine the specific humidity based on the second ambient temperature and the first ambient barometric pressure.

Example 8 includes the system of example 6, including or excluding optional features. In this example, the instructions are executable by the computer processor device to determine that the humidity sensor is faulty based on the first ambient barometric pressure and a second ambient barometric pressure determined using an engine barometric pressure sensor. Additionally, the instructions are executable by the computer processor to determine the specific humidity based on the first ambient temperature and the second ambient barometric pressure.

Example 9 includes the system of example 6, including or excluding optional features. In this example, the instructions are executable by the computer processor device to determine that the humidity sensor is faulty based on the first ambient temperature, a second ambient temperature determined using an engine temperature sensor, the first ambient barometric pressure, and a second ambient barometric pressure determined using an engine barometric pressure sensor. Further, the instructions are executable by the computer processor device to determine the specific humidity based on the second ambient temperature and the second ambient barometric pressure.

Example 10 is a system for controlling combustion in a marine drive. This example includes a computer processor device, and a computer memory device comprising instructions that are executable by the computer processor device to control an intake airflow of the engine. The intake airflow is controlled by determining a new intake airflow based on the load of the engine and the specific humidity. Additionally, the intake airflow is controlled by determining a throttle opening of the engine based on the new intake airflow.

Example 11 includes the system of example 10, including or excluding optional features. In this example, the instructions are executable by the computer processor device to determine a base spark advance based on a predetermined nominal humidity, a load of the engine, and a revolutions per minute (RPM) value of the engine. Further, the instructions are executable by the computer processor device to determine a humidity offset value based on a specific humidity of intake air to the engine and the load of the engine. Additionally, the instructions are executable by the computer processor device to determine a controlling spark advance value based on the base spark advance and the humidity offset value. Further, the instructions are executable by the computer processor device to send the controlling spark advance value to an ignition system the engine.

Example 12 includes the system of example 11, including or excluding optional features. In this example, determining the base spark advance involves performing a lookup in a base spark map. The base spark map maps the base spark advance to the predetermined nominal humidity, the load, and the RPM value.

Example 13 includes the system of example 11, including or excluding optional features. In this example, determining the humidity offset value involves performing a lookup in a humidity offset map. The humidity offset map maps the humidity offset value to the specific humidity and the load.

Example 14 includes the system of example 11, including or excluding optional features. In this example, the instructions are executable by the computer processor device to control the timing of the spark in the engine by determining the spark advance for the spark plug in response to a change in the load of the engine.

Example 15 includes the system of example 11, including or excluding optional features. In this example, the instructions are executable by the computer processor device to control an intake airflow of the engine by determining a new intake airflow based on the load of the engine and the specific humidity. Additionally, the intake airflow is controlled by determining a throttle opening of the engine based on the new intake airflow. Further, the intake airflow is controlled by sending the determined throttle opening to the throttle motor.

Example 16 includes the system of example 11, including or excluding optional features. In this example, the instructions are executable by the computer processor device to determine the specific humidity by determining a first ambient temperature using a temperature sensor of a humidity sensor. Additionally, the specific humidity is determined by determining a first ambient barometric pressure using a barometric pressure sensor of the humidity sensor. Further, the specific humidity is determined by determining the specific humidity based on the first ambient temperature and the first ambient barometric pressure.

Example 17 includes the system of example 16, including or excluding optional features. In this example, the instructions are executable by the computer processor device to determine that the humidity sensor is faulty based on the first ambient temperature, a second ambient temperature determined using an engine temperature sensor, the first ambient barometric pressure, and a second ambient barometric pressure determined using an engine barometric pressure sensor. Additionally, the instructions are executable by the computer processor device to determine the specific humidity based on the second ambient temperature and the second ambient barometric pressure.

Example 18 is a system for controlling combustion in a marine drive. This example includes an engine, a computer processor device, and a computer memory device comprising instructions that are executable by the computer processor device to control a timing of spark in the engine. The timing of the spark is controlled by determining a base spark advance based on a predetermined nominal humidity, a load of the engine, and a revolutions per minute (RPM) value of the engine. Additionally, the timing of the spark is controlled by determining a humidity offset value based on a specific humidity of intake air to the engine and the load of the engine. Further, the timing of the spark is controlled by determining a controlling spark advance value based on the base spark advance and the humidity offset value. Additionally, the timing of the spark is controlled by sending the controlling spark advance value to an ignition system of the engine.

Example 19 includes the system of example 18, including or excluding optional features. In this example, the instructions are executable by the computer processor device to control an intake airflow of the engine by determining a new intake airflow based on the load of the engine and the specific humidity. Additionally, the intake airflow is controlled by determining a throttle opening of the engine based on the new intake airflow. Further, the intake airflow is controlled by sending the determined throttle opening to the throttle motor. Additionally, the intake airflow is controlled by controlling an opening of the throttle based on the determined throttle opening.

Example 20 includes the system of example 18, including or excluding optional features. In this example, the instructions are executable by the computer processor device to determine a first ambient temperature using a temperature sensor of a humidity sensor. Additionally, the instructions are executable by the computer processor to determine a first ambient barometric pressure using a barometric pressure sensor of the humidity sensor. Further, the instructions are executable by the computer processor to determine the specific humidity based on the first ambient temperature and the first ambient barometric pressure. Additionally, the instructions are executable by the computer processor to determine that the humidity sensor is faulty based on the first ambient temperature, a second ambient temperature determined using an engine temperature sensor, the first ambient barometric pressure, and a second ambient barometric pressure determined using an engine barometric pressure sensor. Further, the instructions are executable by the computer processor to determine the specific humidity based on the second ambient temperature and the second ambient barometric pressure.

It should be understood that above-described operations of the methods of FIGS. 7 and 9 can be executed or performed in any suitable order or sequence not limited to the order and sequence shown and described in the figures. Also, some of the above operations of these methods can be executed or performed substantially simultaneously, or in parallel, where appropriate and/or to reduce latency and processing times.

This written description uses examples to disclose the invention and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for controlling combustion in a marine drive, the system comprising:
- a computer processor device; and
- a computer memory device comprising instructions that are executable by the computer processor device to control a timing of spark in an engine, by:
  - determining a base spark advance based on a predetermined nominal humidity, a load of the engine, and a revolutions per minute (RPM) value of the engine;
  - determining a humidity offset value based on a specific humidity of intake air to the engine and the load of the engine;
  - determining a controlling spark advance value based on the base spark advance and the humidity offset value; and
  - sending the controlling spark advance value to an ignition system of the engine.

2. The system according to claim 1, wherein determining the base spark advance comprises performing a lookup in a base spark map, wherein the base spark map maps the base spark advance to the predetermined nominal humidity, the load, and the RPM value.

3. The system according to claim 1, wherein determining the humidity offset value comprises performing a lookup in a humidity offset map, wherein the humidity offset map maps the humidity offset value to the specific humidity and the load.

4. The system of claim 1, wherein the instructions are executable by the computer processor device to control the timing of the spark in the engine by determining the spark advance for a spark plug in response to a change in the load of the engine.

5. The system of claim 1, wherein the instructions are executable by the computer processor device to control an intake airflow of the engine by:
- calculating a modified intake airflow based on a humidity airflow correction, the load of the engine and the specific humidity;
- determining a throttle opening of the engine based on the modified intake airflow; and
- sending the determined throttle opening to a throttle motor.

6. The system according to claim 1, wherein the instructions are executable by the computer processor device to determine the specific humidity, by:
- determining a first ambient temperature using a temperature sensor of a humidity sensor;
- determining a first ambient barometric pressure using a barometric pressure sensor of the humidity sensor; and
- determining the specific humidity based on the first ambient temperature and the first ambient barometric pressure.

7. The system according to claim 6, wherein the instructions are executable by the computer processor device to:
- determine that the humidity sensor is faulty based on the first ambient temperature and a second ambient temperature determined using an engine temperature sensor; and
- determine the specific humidity based on the second ambient temperature and the first ambient barometric pressure.

8. The system according to claim 6, wherein the instructions are executable by the computer processor device to:
- determine that the humidity sensor is faulty based on the first ambient barometric pressure and a second ambient barometric pressure determined using an engine barometric pressure sensor; and
- determine the specific humidity based on the first ambient temperature and the second ambient barometric pressure.

9. The system of claim 6, wherein the instructions are executable by the computer processor device to:
- determine that the humidity sensor is faulty based on the first ambient temperature, a second ambient temperature determined using an engine temperature sensor, the first ambient barometric pressure, and a second ambient barometric pressure determined using an engine barometric pressure sensor; and
- determine the specific humidity based on the second ambient temperature and the second ambient barometric pressure.

10. A system for controlling combustion in a marine drive, the system comprising:
- a computer processor device; and
- a computer memory device comprising instructions that are executable by the computer processor device to control an intake airflow of an engine by:
- calculating a modified intake airflow based on a humidity airflow correction, a load of the engine and a specific humidity; and
- determining a throttle opening of the engine based on the modified intake airflow.

11. The system according to claim 10, wherein the instructions are executable by the computer processor device to:
- determine a base spark advance based on a predetermined nominal humidity, the load of the engine, and a revolutions per minute (RPM) value of the engine;
- determine a humidity offset value based on the specific humidity of intake air to the engine and the load of the engine;
- determine a controlling spark advance value based on the base spark advance and the humidity offset value; and
- send the controlling spark advance value to an ignition system the engine.

12. The system according to claim 11, wherein determining the base spark advance comprises performing a lookup in a base spark map, wherein the base spark map maps the base spark advance to the predetermined nominal humidity, the load, and the RPM value.

13. The system according to claim 11, wherein determining the humidity offset value comprises performing a lookup in a humidity offset map, wherein the humidity offset map maps the humidity offset value to the specific humidity and the load.

14. The system of claim 11, wherein the instructions are executable by the computer processor device to control timing of spark in the engine by determining the spark advance for a spark plug in response to a change in the load of the engine.

15. The system of claim 10, wherein the instructions are executable by the computer processor device to control the intake airflow of the engine by sending the determined throttle opening to a throttle motor.

16. The system according to claim 11, wherein the instructions are executable by the computer processor device to determine the specific humidity, by:

determining a first ambient temperature using a temperature sensor of a humidity sensor;

determining a first ambient barometric pressure using a barometric pressure sensor of the humidity sensor; and determining the specific humidity based on the first ambient temperature and the first ambient barometric pressure.

17. The system of claim 16, wherein the instructions are executable by the computer processor device to:

determine that the humidity sensor is faulty based on the first ambient temperature, a second ambient temperature determined using an engine temperature sensor, the first ambient barometric pressure, and a second ambient barometric pressure determined using an engine barometric pressure sensor; and determine the specific humidity based on the second ambient temperature and the second ambient barometric pressure.

18. A system for controlling combustion in a marine drive, the system comprising:

an engine;

a computer processor device; and a computer memory device comprising instructions that are executable by the computer processor device to control a timing of spark in the engine, by:

determining a base spark advance based on a predetermined nominal humidity, a load of the engine, and a revolutions per minute (RPM) value of the engine;

determining a humidity offset value based on a specific humidity of intake air to the engine and the load of the engine;

determining a controlling spark advance value based on the base spark advance and the humidity offset value; and sending the controlling spark advance value to an ignition system of the engine.

19. The system of claim 18, wherein the instructions are executable by the computer processor device to control an intake airflow of the engine by:

calculating a modified intake airflow based on a humidity airflow correction, the load of the engine and the specific humidity;

determining a throttle opening of the engine based on the modified intake airflow; and sending the determined throttle opening to a throttle motor; and controlling an opening of the throttle based on the determined throttle opening.

20. The system of claim 18, wherein the instructions are executable by the computer processor device to:

determine a first ambient temperature using a temperature sensor of a humidity sensor;

determine a first ambient barometric pressure using a barometric pressure sensor of the humidity sensor;

determine the specific humidity based on the first ambient temperature and the first ambient barometric pressure;

determine that the humidity sensor is faulty based on the first ambient temperature, a second ambient temperature determined using an engine temperature sensor, the first ambient barometric pressure, and a second ambient barometric pressure determined using an engine barometric pressure sensor; and determine the specific humidity based on the second ambient temperature and the second ambient barometric pressure.

* * * * *